United States Patent
Charnley et al.

[11] Patent Number: 6,000,731
[45] Date of Patent: Dec. 14, 1999

[54] ASSEMBLIES AND METHODS FOR COUPLING PIPING TO A SAFE END OF A NUCLEAR REACTOR

[75] Inventors: James E. Charnley, Nevada City; Gerald A. Deaver, San Jose, both of Calif.

[73] Assignee: General Electric Company, Schenectady, N.Y.

[21] Appl. No.: 09/013,534

[22] Filed: Jan. 26, 1998

[51] Int. Cl.$^6$ ................................................ F16L 37/00
[52] U.S. Cl. ........................ 285/319; 376/282; 285/210
[58] Field of Search ......................... 376/282, 286, 376/294; 285/319, 209, 210

[56] References Cited

U.S. PATENT DOCUMENTS

| | | | |
|---|---|---|---|
| 3,245,703 | 4/1966 | Manly | 285/319 |
| 3,455,579 | 7/1969 | Olliff, Jr. et al. | 285/319 |
| 3,912,009 | 10/1975 | Davis, Jr. | 285/319 |
| 4,067,534 | 1/1978 | Frey | 285/319 |
| 4,074,912 | 2/1978 | Van Bilberbeek et al. | 285/319 |
| 4,887,849 | 12/1989 | Briet | 285/319 |
| 5,000,907 | 3/1991 | Chevereau et al. | 376/282 |
| 5,366,254 | 11/1994 | Tucchio et al. | 285/319 |
| 5,372,391 | 12/1994 | Bast et al. | 285/319 |
| 5,395,139 | 3/1995 | Morrisson | 285/319 |

*Primary Examiner*—Eric K Nicholson
*Attorney, Agent, or Firm*—Armstrong Teasdale LLP

[57] ABSTRACT

Thermal sleeve assemblies for connecting a core spray line to a reactor safe end without welding. In one embodiment the thermal sleeve assembly includes a t-box junction, a thermal sleeve and a finger assembly. The t-box junction is attached core spray lines and the thermal sleeve. The finger assembly is coupled to the thermal sleeve and includes several fingers. The finger assembly includes a ring which is coupled to the thermal sleeve so that an opening in the ring is aligned with a bore extending through the thermal sleeve. The fingers are substantially L shaped and are attached to the ring so that when the ring is welded to the thermal sleeve second end the fingers extend from the thermal sleeve.

17 Claims, 2 Drawing Sheets

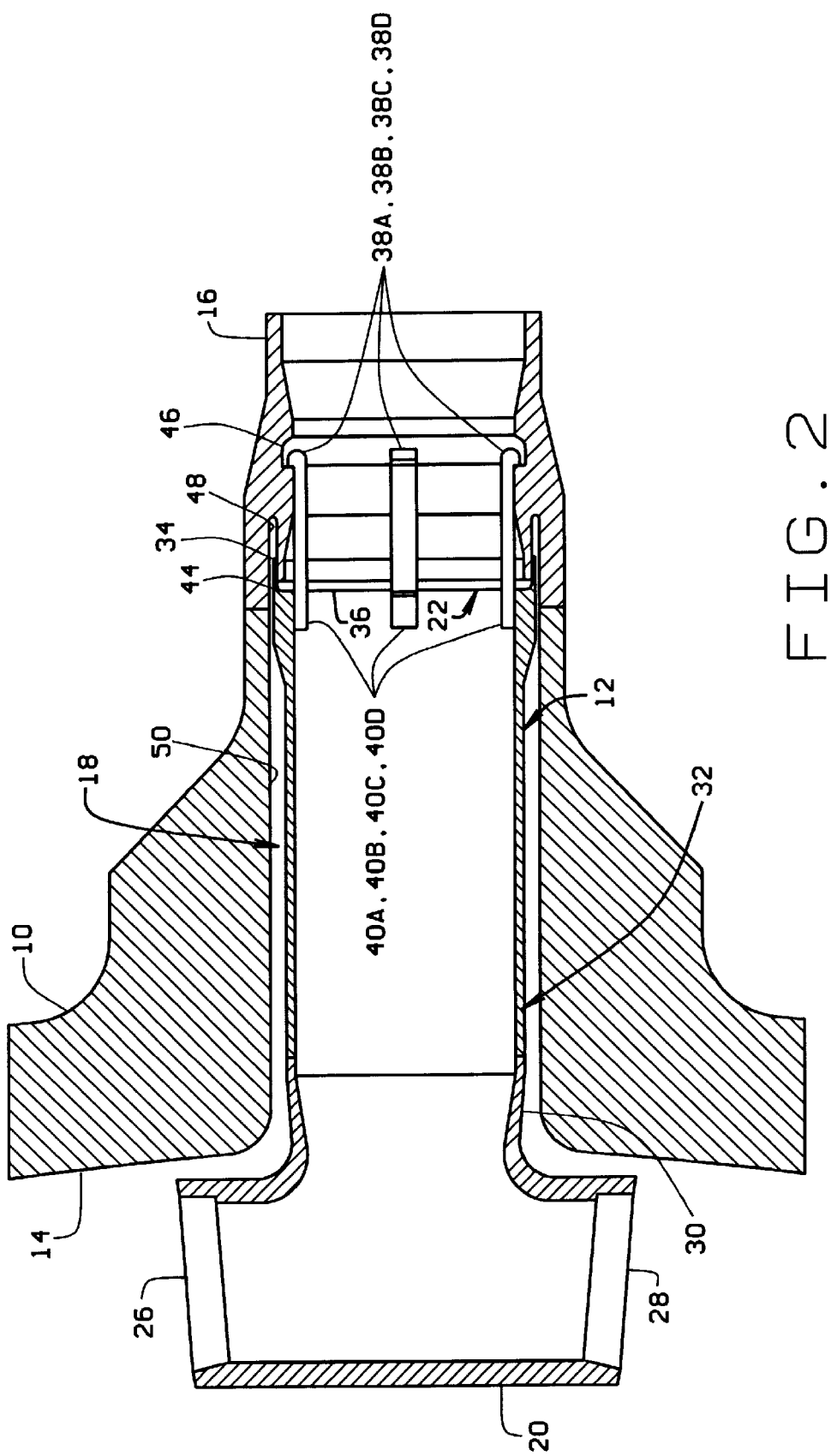

ASSEMBLIES AND METHODS FOR COUPLING PIPING TO A SAFE END OF A NUCLEAR REACTOR

FIELD OF THE INVENTION

This invention relates generally to nuclear reactors and, more particularly, to assemblies and methods for coupling core spray line assemblies within such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spargers inside the RPV and to cool the core. Typically, the core spray piping is coupled to a thermal sleeve which is welded to a RPV nozzle, or safe end.

Stress corrosion cracking (SCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as thermal sleeves and core spray lines, occasionally requires replacement as a result of SCC. Replacing the core spray piping often requires removing the core spray line from the RPV safe end. Because the spray line is welded to the safe end, removing the spray line from the safe end often damages, or breaks, the safe end. To replace the safe end, the reactor must be drained to an elevation below that of the safe end. The safe end is then cut off and a replacement is welded to the RPV. Thereafter, the replacement core spray line is welded to the replacement safe end. Replacing a safe end is time consuming and tedious.

It would be desirable to provide an assembly which facilitates replacing core spray lines without removing the reactor pressure vessel safe end. It also would be desirable to provide such an assembly which is easily removed and installed without the necessity of welding.

SUMMARY OF THE INVENTION

These and other objects are attained by an assembly which, in one embodiment, includes a removable thermal sleeve assembly to facilitate securing a core spray line to a reactor safe end without welding. The thermal sleeve assembly includes a t-box junction, a thermal sleeve and a finger assembly. The t-box junction has three ends with the first and second ends being substantially aligned.

The thermal sleeve has a first end and second end, and the first end is attached to the t-box junction third end. The finger assembly is coupled to the thermal sleeve second end and includes several fingers. Particularly, the finger assembly includes a ring which is coupled to the thermal sleeve so that an opening in the ring is aligned with a bore extending through the thermal sleeve. The fingers are substantially L shaped and are attached to the ring so that when the ring is welded to the thermal sleeve second end, the fingers extend from the thermal sleeve.

The thermal sleeve assembly is inserted at least partially into a bore extending through the safe end so that the fingers engage the surface of the safe end bore. The core spray line is then attached to the t-box junction first and second ends. The resulting connection resists hydraulic and shear loads while providing a low leakage fluid passage from the safe end to the core spray line without welding.

The above-described assembly facilitates replacing the core spray line without removing the safe end or draining the reactor. In addition, such assembly is easily removed and installed without the necessity of welding.

BRIEF DESCRIPTION OF THE DRAWINGS

FIG. 2 is a cross section view of the thermal sleeve assembly coupled to the RPV safe end shown in FIG. 1.

DETAILED DESCRIPTION

Figure 1:
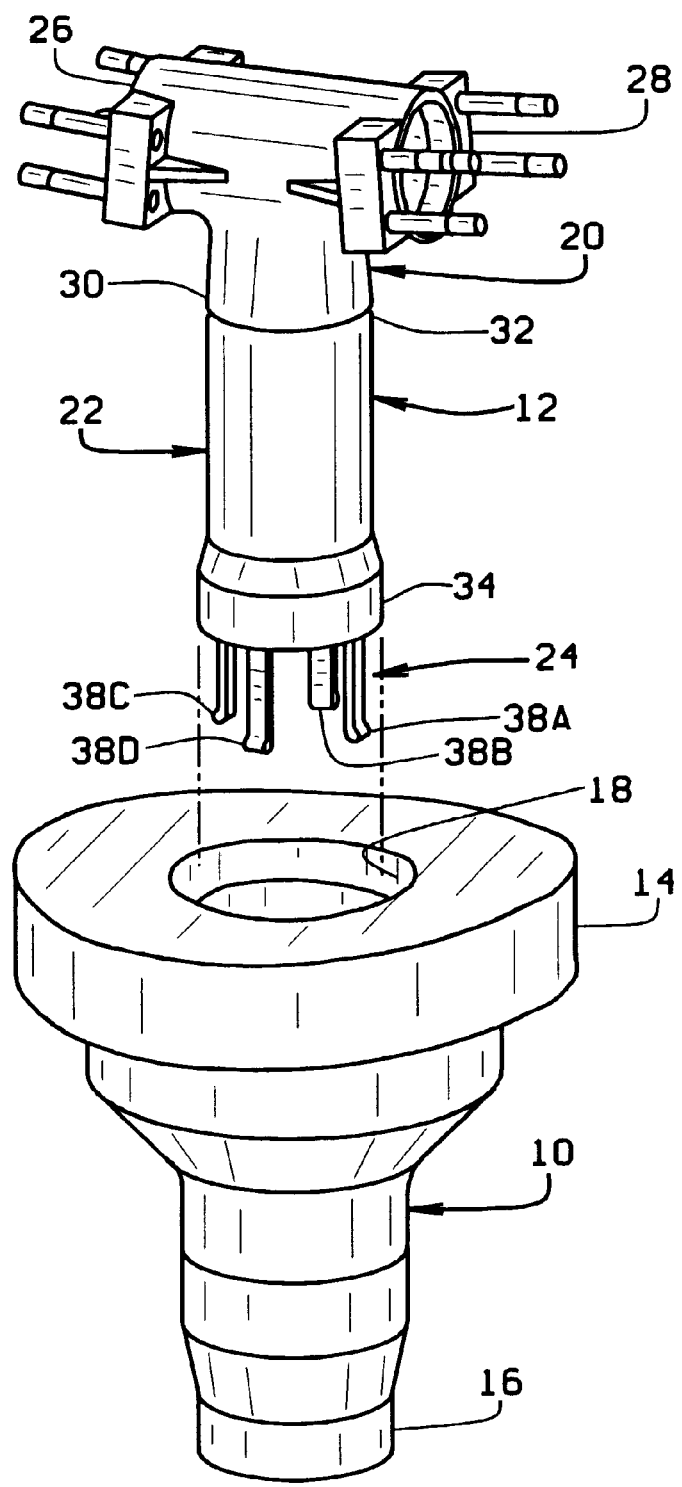
FIG. 1 is an exploded perspective view of a thermal sleeve assembly and a RPV safe end in accordance with one embodiment of the present invention.

FIG. 1 is an exploded perspective view of a RPV safe end 10 and a thermal sleeve assembly 12 in accordance with one embodiment of the present invention. Safe end 10 has a first end 14 and a second end 16, and a bore 18 extends through safe end 10 between first end 14 and second end 16. Bore 18 is sized to receive at least a portion of thermal sleeve assembly 12.

Thermal sleeve assembly 12 includes a t-box junction 20, a thermal sleeve 22 and a finger assembly 24. T-box junction 20 has a first end 26, a second end 28 and a third end 30, and first end 26 is substantially aligned and with second end 28. T-box junction first end 26 and second end 28 are coupled to a core spray line (not shown in FIG. 1).

Thermal sleeve 22, includes a first end 32 and a second end 34, and a bore (not shown) extends between ends 32 and 34, respectively. Thermal sleeve 22 may, for example, be a conventional thermal sleeve, and thermal sleeve first end 32 is attached to t-box junction third end 30.

Referring now to both FIGS. 1 and 2, finger assembly 24 includes a ring 36 and fingers 38A, 38B, 38C and 38D extending substantially coaxially from ring 36. Fingers 38A, 38B, 38C, and 38D are substantially L-shaped and configured to engage a surface of safe end bore 18.

Fingers 38A, 38B, 38C and 38D are attached to ring 36 at their respective first ends 40A, 40B, 40C, and 40D so that their respective second ends 42A, 42B, 42C, 42D are spaced from ring 36. Ring 36 is positioned in thermal sleeve bore 44 and is secured to thermal sleeve second end 34, for example, with a full penetration weld.

Safe end 10 contains a notch 46 and a slot 48 in a surface 50 of safe end bore 18. Slot 48 is sized to receive a portion of thermal sleeve second end 34. Notch 46 is positioned such that when thermal sleeve second end 34 engages slot 48, fingers 38A, 38B, 38C and 38D engage notch 46.

Thermal sleeve assembly 12 is coupled to safe end 10 by inserting fingers 38A, 38B, 38C and 38D into safe end bore 18. As the thermal sleeve assembly 12 continues into the safe end bore 18, fingers 38A, 38B, 38C, and 38D deflect in a radial direction allowing fingers 38A, 38B, 38C, and 38D to fit within safe end bore 18. The thermal sleeve assembly continues into the safe end bore 18 until thermal sleeve assembly second end 34 enters safe end slot 48 and fingers 38A, 38B, 38C and 38D deflect outward and fully engage notch 46. This engagement provides structural rigidity to hold thermal sleeve assembly 12 in position. The core spray line is then attached to t-box junction first end 26 and second end 28. The resulting connection provides a low leakage fluid passage between the core spray line and safe end 10 without the necessity of welding.

To replace the core spray line, thermal sleeve assembly 12 can be removed from safe end 10 by applying a moment or torsion load to thermal sleeve assembly 12. In doing so, fingers 38A, 38B, 38C and 38D will disengage safe end notch 46 allowing easy removal. Thereafter, the core spray line can be removed from t-box junction first end 26 and second end 28 and a new thermal sleeve assembly 12 can be installed without removing safe end 10.

The above-described assembly facilitates replacing the core spray line without removing the safe end or draining the reactor, therefore saving time and avoiding costly power outages. In addition, such assembly is easily removed and installed without the necessity of welding.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the claims. For example, the thermal sleeve assembly was described in connection with coupling piping in nuclear reactors. Such assembly may, however, also be utilized to couple other piping in other devices, e.g., oil refineries.

What is claimed is:

1. A nuclear reactor thermal sleeve assembly for securing a core spray line to a nuclear reactor, said thermal sleeve assembly comprising:

a safe end comprising a first end, a second end, and a bore extending from said first end to said second end, said bore comprising a surface including a notch and a slot;

a thermal sleeve comprising a first end and a second end, said first end configured to couple to the core spray line, and said second end engaging said slot in said safe end bore; and a finger assembly comprising at least one finger, said finger assembly secured to said thermal sleeve second end, said finger assembly engaging said safe end.

2. A thermal sleeve assembly in accordance with claim 1 wherein said finger assembly comprises a ring, said ring coupled to said thermal sleeve second end, said fingers extending from said ring.

3. A thermal sleeve assembly in accordance with claim 2 wherein said ring is secured to the thermal sleeve with a weld.

4. A thermal sleeve assembly in accordance with claim 1 wherein said finger assembly comprises four fingers.

5. A thermal sleeve assembly in accordance with claim 1 wherein said finger assembly engages said notch in said safe end bore.

6. A thermal sleeve assembly in accordance with claim 5 wherein said finger assembly realeasably engages said safe end notch.

7. A thermal sleeve assembly in accordance with claim 1 wherein said finger assembly engages said surface of said safe end bore.

8. A thermal sleeve assembly in accordance with claim 7 wherein said thermal sleeve extends at least partially through said safe end bore.

9. A thermal sleeve assembly in accordance with claim 7 wherein said finger assembly engages said notch in said surface of said safe end bore.

10. A method of connecting a core spray line to a safe end utilizing a thermal sleeve assembly, the thermal sleeve assembly having a thermal sleeve coupled to a finger assembly, said method comprising:

coupling the core spray line to the thermal sleeve assembly;

engaging the finger assembly to the safe end to form a fluid passage from the core spray line to the safe end, the safe end having a first end, a second end and a bore extending from the first end to the second end; and inserting the thermal sleeve into the safe end bore so as to extend at least partially through the safe end bore.

11. A method in accordance with claim 10 wherein the finger assembly includes at least one finger, and said method further comprises the step of engaging at least one finger to the surface of the safe end bore.

12. A method in accordance with claim 11 wherein the safe end has a notch in the surface of the bore, and said method further comprises the step of engaging at least one of the finger to said safe end notch.

13. A core spray line assembly for a reactor pressure vessel of a nuclear reactor, said core spray line assembly comprising:

a thermal sleeve assembly comprising a thermal sleeve and a finger assembly, said thermal sleeve having a first end and a second end, said second end secured to said finger assembly, said finger assembly having at least one finger;

a safe end, said safe end comprising a first end, a second end and a bore extending between said safe end first and second ends, said finger assembly engaging a surface of the safe end bore; and a core spray line engaging said thermal sleeve first end.

14. A core spray line assembly in accordance with claim 13 wherein said finger assembly extends at least partially through said safe end bore.

15. A core spray line assembly in accordance with claim 13 wherein said safe end includes a notch, and wherein said finger assembly is configured to engage said notch.

16. A core spray line assembly in accordance with claim 13 wherein said thermal sleeve extends at least partially through said safe end bore.

17. A core spray line assembly in accordance with claim 16 wherein said safe end further comprises a notch positioned in the surface of said bore, and wherein said finger assembly engages said safe end notch.

* * * * *